(12) United States Patent
Mende et al.

(10) Patent No.: US 6,509,864 B1
(45) Date of Patent: Jan. 21, 2003

(54) DISTANCE MEASURING DEVICE AND METHOD FOR CALIBRATING A DISTANCE MEASURING DEVICE

(75) Inventors: Ralph Mende, Braunschweig (DE); Hermann Rohling, Wolfenbüttel (DE)

(73) Assignee: s. m. s. smart microwave sensors GmbH, Braunschweig (DE)

( * ) Notice: Subject to any disclaimer, the term of this patent is extended or adjusted under 35 U.S.C. 154(b) by 348 days.

(21) Appl. No.: 09/980,834

(22) PCT Filed: Jun. 9, 2000

(86) PCT No.: PCT/DE00/01856
§ 371 (c)(1),
(2), (4) Date: Mar. 6, 2002

(87) PCT Pub. No.: WO00/77542
PCT Pub. Date: Dec. 21, 2000

(30) Foreign Application Priority Data

Jun. 11, 1999 (DE) .......................... 199 26 787

(51) Int. Cl.[7] .............................................. G01S 13/22
(52) U.S. Cl. .......................... 342/118; 342/94; 342/134; 342/137
(58) Field of Search ................................ 342/118, 128, 342/134, 135, 136, 137, 173, 174, 94, 95, 99

(56) References Cited

U.S. PATENT DOCUMENTS

| 3,278,935 A | | 10/1966 | Pearson | 342/169 |
|---|---|---|---|---|
| 3,787,846 A | * | 1/1974 | Bishop | 342/95 |
| 4,125,835 A | * | 11/1978 | Barry | 342/94 |
| 4,319,247 A | * | 3/1982 | Warren | 342/171 |
| 5,160,933 A | * | 11/1992 | Hager | 342/174 |
| 5,563,605 A | * | 10/1996 | McEwan | 342/202 |

FOREIGN PATENT DOCUMENTS

| CH | 652832 A5 | 11/1985 |
|---|---|---|
| DE | DT 2002681 | 8/1970 |
| EP | 0473 082 A2 | 8/1991 |
| WO | WO 94/24580 | 10/1994 |
| WO | WO 98/04930 | 2/1998 |

* cited by examiner

*Primary Examiner*—John B. Sotomayor
(74) *Attorney, Agent, or Firm*—Whitham, Curtis & Christofferson, P.C.

(57) ABSTRACT

The invention relates to a distance measuring device. A transmitting part (E) for electromagnetic radiation especially radar radiation, emits measuring pulses (A, B) which are controlled by a pulse generator (1), and a receiving part (8) is switched to a ready-to-receive mode after a certain, adjustable delay ($T_{DELAY}$, before a next measuring pulse is emitted, for receiving a reflected pulse during a time gate (18). The aim of the invention is to provide a calibration process taking into account all practical defects. To this end, the pulse generator (1) produces pulses with a multiple of the frequency with which the measuring pulses are repeated and a calibrating cycle in which calibrating pulses ($\tau 0$ to $\tau 9$) are produced with pulses generated by the pulse generator (1), controlled by the transmitting part (5), is carried out at longer intervals in time. The calibrating pulses ($\tau 0$ to $\tau 9$) are received directly in the receiving part (8) and the delay time ($T_{DELAY}$) In the receiving part is regulated in such a way that a generated calibrating pulse ($\tau 0$) to $\tau 9$) is received directly by the received directly by the receiving part (8) during a time gate (18).

12 Claims, 1 Drawing Sheet

DISTANCE MEASURING DEVICE AND METHOD FOR CALIBRATING A DISTANCE MEASURING DEVICE

BACKGROUND OF THE INVENTION

Figure 1:
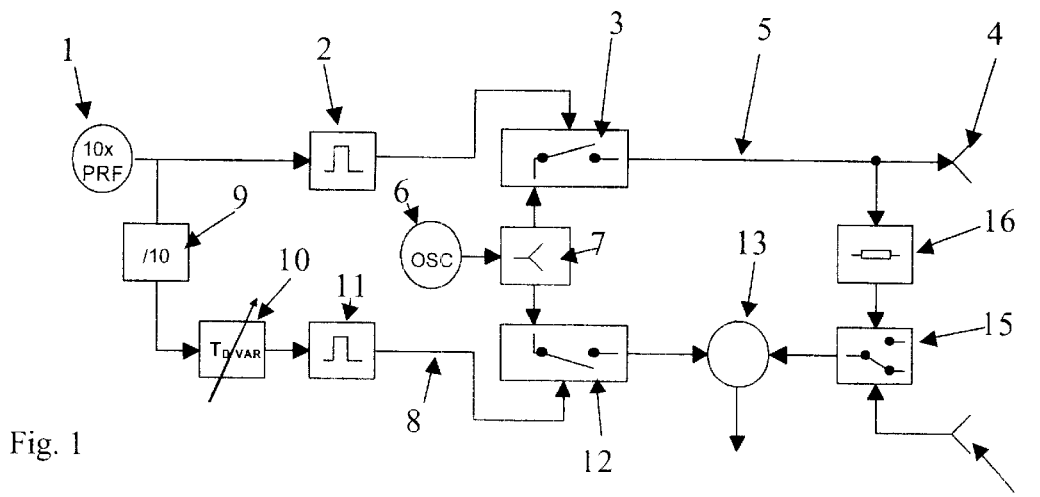

The invention relates to a method for standardizing a distance measuring device in which a transmitter part for electromagnetic radiation, in particular radar radiation, emits measurement pulses which are controlled by a pulse generator, and a receiver part is switched, after a specific adjustable delay before the emission of a subsequent measurement pulse, to a ready-to-receive state for the reception of an echo pulse during a time gate.

The invention also relates to a distance measuring device having a transmitter part for electromagnetic radiation, in particular radar radiation, which has a pulse generator for generating measurement pulses and a transmission antenna, and a receiver part which has a reception antenna and an adjustable delay circuit for setting a time gate for the reception of echo pulses before the emission of a subsequent measurement pulse by the transmitter part.

Distance measuring devices which are suitable for detecting distances and relative speeds are provided in particular as close-range radar systems for automobiles. For this purpose, a number of individual sensors are arranged at suitable points all around the automobile. Instead of radar transmitters, it is also possible to use other transmitters of electromagnetic waves, for example lasers.

The individual sensors are controlled either by a central control unit, or a small number of central control units, or by a separate control and evaluation unit on each individual sensor. These units perform the functions of actuation, monitoring and evaluation of signals.

A desirable distance resolution is, for example, 10 cm. Such distance resolutions cannot normally be achieved in compliance with the legal requirements relating to the allocation of frequencies when there is a measuring range of 30 m with continuously emitting radars. For this reason, it is known, for example, from WO 98/04930 A1 to use pulse radars which emit very short pulses (for example τ=333 ps), the pulse repetition rate usually being approximately 5 MHz, which corresponds to a period of 200 ns, and thus to a uniquely defined range of 30 m between two measurement pulses. The distance measurement is performed here by forming, in the receiver part, a distance gate whose time position can be adjusted by means of an electronically adjustable delay circuit. Here, according to the principle, in each case only one time gate can be sensed using measurement technology. The time gate to be measured is characterized by its width and its position on the time axis. The width of the time gate is usually selected to be equal to the pulse width of the measurement pulses. The position on the time axis can be set by the delay circuit.

For the duration of a certain time period, the control voltage which is used to set the delay circuit can be constant here or can move in a very small voltage interval so that a measurement period for a time gate is implemented on the time axis which is significantly longer than the time period between two measurement pulses. Thus, for example when sensing a range of 25.6 m and a time gate width corresponding to the distance resolution of 10 cm, if 256 gates are implemented each gate can be opened for a time period of 100 μs, respectively. The measurement period for the entire sensed range is in total 25.6 ms here. In all 256 time sections, integration of the reception signal takes place successively for one time gate in each case. Here, an integrating low-pass filter can be used in the baseband. Only the signal from the time range which predefines the delay circuit is integrated in all cases. As a result of the integration of the echo signals which occur in the reception time gate (500 in the example), the signal-to-noise ratio at the output of the low-ass filter can be significantly better than at the input. In order to measure the entire distance range, the delay circuit is adjusted from the minimum to the maximum value, or vice versa.

The precision with which the delay circuit can be set, determines the distance measuring precision, as can be seen. In order to determine the angle at which an object can be detected in the vicinity of the vehicle, it is necessary to measure this object with at least two individual sensors. The angle value can then be acquired by evaluating the measured individual distances using triangulation. The measuring precision which can be achieved in the individual sensors for the distance measurement is therefore also decisive for the precision of angular measurements.

Because of the tolerances of the analog circuit elements which are always present and which occur when the electronic delay is generated, typically only an precision of approximately 1% can be achieved in the setting of the delay, and thus in the distance measurement. The cause of the tolerances are component fluctuations, temperature effects and aging effects.

During the precise measurement of the distance which is set for the delay circuit by the application of the control voltage, and the perceptible distance which is thus set, a characteristic curve is acquired which cannot be precisely reproduced from individual sensor to individual sensor. A software compensation of the respective characteristic curve errors is therefore not possible for a series production device. A higher measuring precision has therefore hitherto only been achievable by means of an individual measurement, with which however errors as a result of temperature changes or aging cannot be detected.

DE-A 2 002 681 discloses a radar distance measuring system which permits a self-calibrating mode of operation. In this mode of operation, a delayed pulse is emitted via a delay line and conducted directly to the receiver via an attenuation device. In the receiver, a measuring circuit for the time up to the reception of an echo signal is started with each pulse of a pulse generator, it being possible for said measuring circuit to be composed, for example, of a saw-tooth generator. When the echo signal is received, the instantaneous voltage is evaluated as a measure of the time which has passed since the emission of the measurement pulse—and thus as a measure of the distance. The pulse which is emitted with a delay during the standardization operation is fed as a simulated echo signal to the reception circuit. The measured value for the time which has passed since the triggering of the pulse is compared with a reference value. In a further embodiment of this device, both the delays and the attenuations can be switched as a function of the current measuring range in order to obtain the standardization for the current measuring range. Standardization which can compensate measuring errors as a result of temperature changes, aging, component tolerances or the like is not possible by means of the known arrangement because the delay circuits and possibly also the test signal sources themselves may be temperature-dependent, aging-dependent and tolerance-dependent.

U.S. Pat. No. 3,278,935 discloses a radar test device in which radar targets are simulated. For this purpose, a reverberation signal, which is composed of pulses at equal intervals with decreasing amplitude [lacuna] from an emitted transmission pulse. In this way, radar targets which are at a fixed, predefined distance from one another are simulated. As a result, it is possible to standardize the reproduction of radar targets, for example on a radar screen, because there must be an equal distance in each case between the simulated radar targets. The present invention is based on the problem of permitting a higher degree of measuring precision for radar distance measuring devices, it being possible to detect errors due to component tolerances, temperature changes and aging, and there being no need for a high degree of expenditure on individual measurements.

Taking this problem as a starting point, the method mentioned at the beginning for standardizing a distance measuring device is characterized according to the invention in that the pulse generator produces pulses which are a multiple of the pulse repetition rate of the measurement pulses, in that a standardization cycle is carried out at relatively long time intervals by producing standardization pulses with pulses generated by the pulse generator under the control of the transmitter part, in that the standardization pulses can be received directly in the receiver part, and in that the delay in the receiver part is set in such a way that a generated standardization pulse is received by the receiver part directly during a time gate.

Taking the abovementioned problem as a starting point, a distance measuring device of the type mentioned at the beginning is also characterized in that the pulse generator generates pulses with a repetition rate which corresponds to a multiple of the pulse repetition rate of the measurement pulses, in that standardization cycle, which is switched on at relatively long time intervals, with pulses of the pulse generator under the control of the transmitter part, in that the standardization pulses can be received directly by the receiver part by means of a short-circuit coupling, and in that an evaluation device is provided for matching the timing of the time gate and standardization pulse.

SUMMARY OF THE INVENTION

The invention is based on the idea of using the chronological precision of the formation of pulses by the generator, for example by a quartz generator, for the automatic standardization, to be continuously repeated of the delay circuit in the receiver part. For this purpose, standardization pulses which are located between the measurement pulses are generated in the standardization cycle, It is easily possible to generate such standardization pulses by multiplying the frequency of the generator which generates the measurement pulses. Therefore, by multiplying the pulse repetition rate of the generator by ten, nine intermediate pulses between two measurement pulses are produced and said intermediate pulses are at a defined chronological interval from the preceding measurement pulse. Because only the measurement pulse is active in the receiver part and the standardization pulses are used only for the transmitter part, a time gate, which can more or less coincide with a standardization pulse of the transmitter part which is fed directly into the receiver part, is formed in the receiver part by the measurement pulse and the delay circuit. By actuating the delay circuit with a control voltage it is possible to set the delay in such a way that the time gate which is formed coincides as precisely as possible with a standardization pulse. In this way, the delay time which corresponds to a certain distance can be checked and set with the precision of the quartz of the generator in the transmitter part. This setting can be carried out for chronologically different standardization pulses so that reference values for the control-voltage/delay characteristic curve are automatically acquired and can be used to standardize or correct the characteristic curve.

The standardization method according to the invention is also suitable in particular for radar systems in which high-frequency signal wave sections, whose section widths are determined by the width of the pulses of a generator, are used as measurement pulses.

It is possible here to compare the time gate with the pulse which limits the signal wave section or to compare the respective signal wave sections with one another, in which case both the pulse of the generator in the transmitter part and the time gate in the receiver part can each connect through a signal wave section of the same oscillator.

The multiplication according to the invention of the pulse repetition rate of the generator in the transmitter part would normally make it necessary to use components which can operate with the multiplied frequency. This can be avoided if in each case only one standardization pulse of the multiplied frequency is used and the other generated pulses are blocked by a masking circuit. The masking arrangement permits the various standardization pulses to be successively connected through so that the multiplicity of reference values for the characteristic curve can be acquired. Because only one standardization pulse is ever transmitted in the interval between two measurement pulses despite the multiplication of the pulse repetition rate of the generator, it is not necessary to use components which have to have an increased speed. The masking of the pulses which are not transmitted can take place in the transmitter part, but can also take place in the receiver part. It is also possible to mask both in the transmitter part and in the receiver part, if appropriate in different ways.

The short-circuit coupling between the transmitter part and receiver part can be implemented by manufacturing appropriate, possibly attenuated connecting lines between the transmitter part and receiver part. However, it is also possible to use a coupling which cannot be completely suppressed between the transmitter part and the receiver part, for example a direct coupling between the transmission antenna and reception antenna or a reflection at a radome which is usually located in very close proximity in front of the antennas, for the standardization according to the invention. In this case, additional components for the implementation of the short-circuit coupling can be dispensed with.

BRIEF DESCRIPTION OF THE INVENTION

Figure 2:
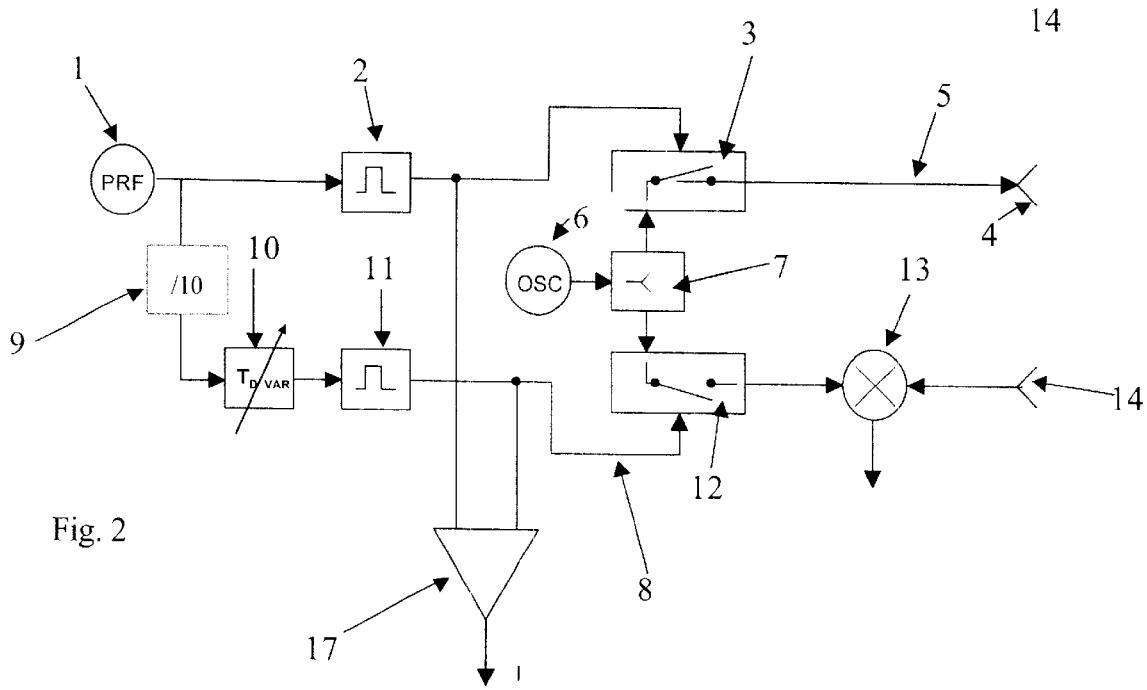
Figure 3:
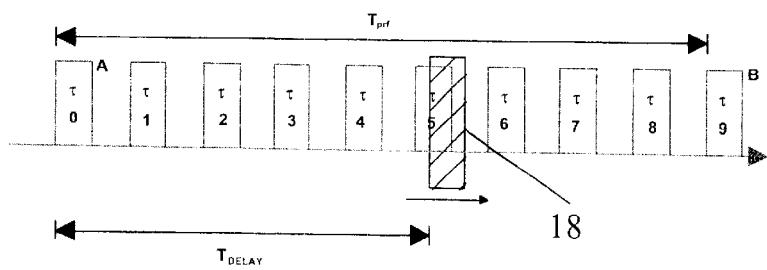

The invention will be explained in more detail below with reference to exemplary embodiments illustrated in the drawing, in which:

FIG. 1 shows a block diagram of a distance measuring device according to the invention, with which a standardization cycle can be carried out, in accordance with a first embodiment, FIG. 2 shows a block diagram of a distance measuring device according to the invention with which a standardization cycle can be carried out, according to a second embodiment, FIG. 3 shows a schematic representation of the measurement pulses and standardization pulses in order to explain the standardization principle.

DETAILED DESCRIPTION OF THE INVENTION

FIG. 1 shows a block circuit diagram in which a generator 1, a pulse shaper 2, a switch 3 and a transmission antenna 4 form a transmitter part 5. Here, the switch 3 is switched on and off by the pulses of the generator 1 which are present at the output of the pulse shaper 2 so that a high frequency wave which is generated by an oscillator 6 and conducted to the transmission switch 3 via a fork 7 is connected through to the transmission antenna 4 during the pulse duration.

A receiver part 8 receives the output signal of the generator 1 via a frequency divider 9. Its output signals are fed to a delay circuit 10 which can be electronically adjusted with a control voltage. Its output pulses activate and deactivate a reception switch 12 via a pulse shaper 11 so that the pulse duration of the output pulse, shaped by the pulse shaper 11, of the electronic delay circuit 10 forms a time gate. During the time gate, the high-frequency wave of the oscillator 6 is fed via the fork 7 and the closed switch 12 to an input of a mixer stage 13. An echo signal which is received by a reception antenna 14 is fed to the other input of the mixer stage 13 by means of a changeover switch 15 in its reception position. During a standardization cycle, the changeover switch 15 is switched over so that the second input of the mixer stage 13 is then connected to the input of the transmission antenna 4 via an attenuator 16. The attenuator 16 and the changeover switch 15 then form a short-circuit coupling between the transmitter part 5 and receiver part 8.

In the normal measuring mode, the generator 1 emits measurement pulses with its normal pulse repetition rate. Each measurement pulse is shaped by the pulse shaper 2 and determines the switch-on duration of the transmission switch 3 by means of its pulse width so that during the pulse width a high-frequency wave of the oscillator 6 is fed to the transmission antenna 4. For the measuring mode, the output pulse of the generator 1 is fed directly to the input of the electronic delay circuit 10 with which a time gate which corresponds to a specific distance is defined. During the time gate, the high-frequency wave of the oscillator 6 is fed to the first input of the mixer stage 13. If an echo signal is received by the reception antenna 14 within the time gate, this means that a reflection of the transmission signal has taken place at an object in the distance defined by the time gate. The echo signal received by the reception antenna 14 is fed to the second input of the mixer stage 13. If identical high-frequency waves are present at both inputs of the mixer stage 13, an output signal which is proportional to the coincidence is produced as a measurement signal for the respective distance. If a signal is present at one input of the mixer stage 13, but there is no signal at the other, a zero output signal is produced.

In order to carry out a standardization cycle, the generator 1 generates pulses with a multiple pulse repetition rate, with ten times the frequency in the exemplary embodiment illustrated. Because these pulses are fed to the delay circuit 10 via a frequency divider 9 which divides the frequency by ten, only one time gate is generated in the receiver part 8—as in the measuring mode. On the other hand, in the transmitter part, ten pulses are produced instead of one pulse in the measuring mode. Accordingly, nine intermediate pulses are generated as standardization pulses between the times of the measurement pulses. These are fed via the short-circuit coupling 16, 15 (after the switching over of the changeover switch 15 to the standardization mode) to the mixer stage 13. If the time gate formed by the delay circuit 10 coincides with a standardization pulse, the mixer stage 13 generates a maximum output signal. Given only partial correspondence, re-adjustment of the delay circuit 10 can be performed to maximize the output signal of the mixer stage 13 in order in this way to detect the control voltage which is required at a given time for a specific distance corresponding to the respective standardization pulse. This standardization can be performed for all new standardization pulses in order thus to determine the reference values for the characteristic curve. Or course, a further increase in the pulse repetition rate of the generator 1 can result in even finer subdivision of the measurement interval—and thus even more precise standardization.

If a certain degree of crosscoupling takes places as a result of the arrangement of the transmission antenna 4 and reception antenna 14, the short-circuit coupling which is brought about as a result can be utilized for the standardization at the mixer stage 13 so that the attenuator 16 and the switch 15 can be dispensed with.

In the exemplary embodiment illustrate in FIG. 2, the high-frequency wave sections which are formed are not compared with one another for the standardization but rather the time gate formed by the delay circuit 10 and the pulse shaper 11 on the one hand and the output pulse, formed by the pulse shaper 2, of the generator 1 on the other. This comparison is possible with a low-frequency comparator amplifier which is, if appropriate, combined with an integrator.

FIG. 3 shows shaped output pulses of the generator 1 which form measurement pulses A, B . . . With the pulse repetition rate $T_{prf}$. As a result of the multiplication of the pulse repetition rate (factor 9 here) standardization pulses τ0 . . . τ9, which are located at the position of the measurement pulses A, B, but also equidistantly in the interval between the measurement pulses A, B, are produced. FIG. 3 shows a schematic view of a time gate 16 which can be displaced on the time axis by the delay $T_{DELAY}$ set in the delay circuit 10. The width of the time gate 18 is preferably set to be equal to the width of the standardization pulses τ0 by means of the design of the pulse shapers 2, 11.

The standardization pulses and measurement pulses can be implemented, for example by means of a 50 MHz quartz with a switchable prescaler (:10 or :1). With a customary quartz, the frequency error is less than 100 ppm. The standardization pulses τ0 to τ9 thus form a time base with a high degree of precision which permits precise standardization of the delay $T_{DELAY}$ as a function of the control voltage of the electronic delay circuit 10.

The standardization cycle according to the invention can be effectively switched at predefined intervals by the program of the distance measuring device so that the distance measuring device is always automatically standardization again. Standardization at intervals of 1 to 10 s is generally sufficient and also allows for rapid temperature changes.

What is claimed is:

1. A method for standardizing a distance measuring device in which a transmitter part (5) for electromagnetic radiation, in particular radar radiation, emits measurement pulses (A, B) which are controlled by a pulse generator (1), and a receiver part (8) is switched, after a specific adjustable delay ($T_{DELAY}$) before the emission of a subsequent measurement pulse, to a ready-to-receiver state for the reception of an echo pulse during a time gate (18), characterized in that the pulse generator (1) produces pulses which are a multiple of the pulse repetition rate of the measurement pulses, in that a standardization cycle is carried out at relatively long time intervals by producing standardization pulses (τ0 to τ9) with pulses generated by the pulse generator (1) under the control of the transmitter part (5), in that the standardization pulses (τ0 to τ9) can be received directly in the receiver part (8), and in that the delay ($T_{DELAY}$) in the receiver part (8) is set in such a way that a generated standardization pulse (τ0 to τ9) is received by the receiver part (8) directly during a time gate (18).

2. The method as claimed in claim 1, characterized in that a standardization pulse (τ0 to τ9) is compared chronologically with the time gate (18) at the output of the delay circuit (10) in the receiver part (8).

3. The method as claimed in claim 1, characterized in that the width of the time gate (18) is set in accordance with the duration of a standardization pulse (τ0 to τ9).

4. The method as claimed in claim 1, characterized in that high-frequency signal wave sections, whose section widths are determined by the width of the pulses of a generator (1), are used as measurement pulses (A, B).

5. The method as claimed in claim 4, characterized in that a pulse of the generator (1) is compared with the time gate (18) at the output of the delay circuit (10) during the standardization cycle.

6. The method as claimed in claim 4, characterized in that a signal wave section which corresponds to the standardization pulse (τ0 to τ9) and is compared with a standardization pulse fed directly into the receiver part (8) is generated in the receiver part (8) with the time gate (18).

7. The method as claimed in claim 1, characterized in that in each case only one of the standardization pulses (τ0 to τ9) which are located in the interval between two measurement pulses (A, B) is used and the other standardization pulses (τ0 to τ9) are blocked.

8. A distance measuring device having a transmitter part (5) for electromagnetic radiation, in particular radar radiation, which has a pulses generator (1) for generating measurement pulses (A, B) and a transmission antenna (4), and a receiver part (8) which has a reception antenna (14) and an adjustable delay circuit (10) for setting a time gate (18) for the reception of echo pulses before the emission of a subsequent measurement pulse by the transmitter part (5), characterized in that the pulse generator (1) generates pulses with a repetition rate which corresponds to a multiple of the pulse repetition rate of the measurement pulses, in that standardization pulses (τ0 to τ9) can be produced, in a standardization cycle which is switched on at relatively long time intervals, with pulses of the pulse generator (1) under the control of the transmitter part (5), in that the standardization pulses (τ0 to τ9) can be received directly by the receiver part (8) by means of a short-circuit coupling (16, 15; 17), and in that an evaluation device (13, 17) is provided for matching the timing of the time gate (18) and standardization pulse (τ0 to τ9).

9. The distance measuring device as claimed in claim 8, characterized in that the output of the generator (1) is connected to a first input, and the output of the delay circuit (10) is connected to a second input of a comparator stage (17).

10. The distance measuring device as claimed in claim 8, characterized in that the output of the generator (1) in the transmitter part (5) controls a transmission switch (3) for connecting through a high-frequency wave of an oscillator (6) with the standardization pulses (τ0 to τ9), in that the delay circuit (10) controls a reception switch (12) for connecting through the high-frequency wave of the oscillator (6) with the time gate (18) generated from a measurement pulse (A, B), and in that the two connected-through high-frequency waves arrive at two inputs of a comparator device (13).

11. The distance measuring device as claimed in claim 8, characterized by an attenuated coupling path (16, 15) between the transmitter part (5) and the receiver part (8).

12. The distance measuring device as claimed in claim 8, characterized by a generator (1) which operates with a frequency which is a multiple of the frequency of the measurement pulses (A, B), and an adjustable marking circuit which transmits only one of the standardization pulses (τ0 to τ9) in the interval between the measurement pulses (A, B).

* * * * *